US005759944A

United States Patent [19]

Buchanan et al.

[11] Patent Number: 5,759,944
[45] Date of Patent: Jun. 2, 1998

[54] CATALYST MATERIAL

[75] Inventors: Jeffrey S Buchanan, Mount Laurel, N.J.; Robert J Potter, Chalkhouse Green; Thomas R Ralph, Reading, both of United Kingdom

[73] Assignee: Johnson Matthey Public Limited Company, London, England

[21] Appl. No.: 897,158

[22] Filed: Jul. 18, 1997

Related U.S. Application Data

[63] Continuation of Ser. No. 537,845, filed as PCT/GB94/00835 Apr. 20, 1994, abandoned.

[30] Foreign Application Priority Data

Apr. 20, 1993 [GB] United Kingdom ............ 9308094

[51] Int. Cl.$^6$ .................................. B01J 21/18
[52] U.S. Cl. .................. 502/185; 502/101; 502/184; 204/293; 429/42
[58] Field of Search ................... 502/101, 184, 502/185; 204/293; 429/42

[56] References Cited

U.S. PATENT DOCUMENTS

| 3,650,838 | 3/1972  | Giner  | 429/13    |
| 3,933,684 | 1/1976  | Petrow | 502/101   |
| 4,784,730 | 11/1988 | Willis | 204/290 R |
| 5,302,256 | 4/1994  | Miura  | 205/85    |

FOREIGN PATENT DOCUMENTS

| 450 849  | 10/1991 | European Pat. Off. . |
| 557 674  | 9/1993  | European Pat. Off. . |
| 14 71 790 | 5/1969 | Germany . |

Primary Examiner—Bruce F. Bell
Attorney, Agent, or Firm—Pillsbury Madison & Sutro LLP

[57] ABSTRACT

An electrocatalyst material for use in an acid electrolyte environment, comprising platinum or a platinum alloy supported on a conductive support, and gold, gives unexpectedly improved performance over similar electrocatalysts without gold.

9 Claims, No Drawings

CATALYST MATERIAL

This is a continuation of application Ser. No. 08/537,845, filed on Jan. 18, 1996, which was abandoned upon the filing hereof, which was a 371 of PCT/GB94/00835, filed on Apr. 20, 1994, now abandoned.

This invention concerns an improved catalyst material, and in particular an improved electrocatalyst material for use in acid electrolyte fuel cell.

In the art of fuel cells, there have been very many proposals for the production of electrocatalysts which are used to coat one or both of the electrodes. It is useful to recall that in a fuel cell, a fuel, which may be hydrogen, a hydrocarbon or an oxygen-containing fuel such as methanol is oxidised at a fuel electrode (anode) and oxygen is reduced at the cathode. An electrolyte contacts the electrodes, and may be alkaline or acidic, liquid or solid. The phosphoric acid fuel cell (PAFC) is the type of fuel cell closest to commercialisation and there are a number of demonstration units, especially in Japan where there are considerable economic and environmental pressures to reduce imports of hydrocarbon fuels and to cut polluting emissions from power generation. Many people consider that fuel cells are however, unlikely to get beyond the demonstration stage, because the power output is too low for the capital costs involved. In the PAFC, power output is limited in part by the activity of the cathode catalyst. Increasing cathode catalyst activity can result in higher power density at the same efficiency. The capital cost per unit of power is therefore reduced in proportion to the increase in performance. Because the cost of the cathode catalyst is only a fraction of the cost of the fuel cell stack, increasing the power density of the stack reduces the capital cost per unit of power out of all proportion to the value of the catalyst per se. It is therefore widely recognised that a cathode catalyst with improved performance would have great value in reducing overall capital cost per unit power.

We have found, surprisingly, that the addition of gold to an existing electrocatalyst, used in an acid electrolyte fuel cell, gives an improved performance catalyst. Previously, gold has been considered ineffective as an electrocatalyst under acid conditions, mainly because of the weakness of the metal-oxygen bond strength. (See, for example, "Fuel Cell Handbook", Eds A J Appleby and F R Foulke, p 383, Van Norstrand Reinhold, N.Y. (1989) and U.S. Pat. No. 3,223,556.)

The preset invention provides an electrocatalyst material for use in an acid electrolyte environment, comprising platinum alloyed with at least one alloying element and gold, supported on a conductive support, the atomic ratio of platinum to the alloying element being in the range 80:20 to 20:80, and wherein the gold is present in a loading of 0.0001 up to but not including 3 wt % of the total catalyst weight.

This invention also provides an electrode for use in an acid electrolyte environment containing the electrocatalyst of the present invention.

Yet further, this invention provides an acid electrolyte fuel cell employing the electrocatalyst material of the present invention.

Where the electrocatalyst material comprises a platinum alloy, preferably the alloying element(s) are selected from the transition metals, more preferably from Groups IVB, VIB, VIIB, VII, IB and IIIA of the Periodic Table in "Handbook of Chemistry and Physics", 64th edition, CRC Press. Even more preferably, the alloying elements are selected from one or more of Ti, Cr, Mn, Fe, Co, Ni, Cu, Ga, Zr and Hf, especially one or more of Cr, Mn, Co and Ni.

Suitable conductive supports are for example commercially available conductive carbons. Supports may be specifically prepared for this application. Preferred carbons may be selected from the oil furnace carbon blacks or acetylene black. They may be used as prepared commercially, or specifically treated to increase their graphitic character.

Preferred gold loadings are in the range 0.1 to 1 wt % of the total catalyst weight.

In a method for the manufacture of the novel electrocatalyst material of the invention, one or more compounds of gold may be added to a slurry of an existing Pt catalyst material to obtain the electrocatalyst material. The method may comprise the steps of the addition of at least one compound of gold to a slurry of a platinum catalyst, followed by reduction of the gold. The method involves the preformation of the electrode followed by the retrospective deposition of gold rather than the co-deposition of platinum and gold. The platinum is in a reduced state prior to the addition of a gold precursor. A chemical reducing agent is used to reduce the gold.

In some instant small amounts of rhodium such as 0.05 to 0.5 wt % may advantageously be added with the gold.

The electrocatalyst material of the present invention may be prepared by a number of methods, known to those skilled in the art of catalysis.

An electrode employing the electrocatalyst material of the present invention demonstrates unexpectedly superior performance compared to equivalent electrodes employing electrocatalyst materials not comprising gold. In particular, performance over a wide range of test conditions, including with different carbon support materials, is demonstrated.

An added advantage of the use of the electrocatalyst materials of the present invention is believed to be improved control of the water content of the fuel cell catalyst. We believe gold provides this control more efficiently than the commonly used hydrophobic polymers, such as polytetrafluoroethylene (PTFE), which is used in electrode manufacture both to bind the electrocatalyst material and to make it hydrophobic.

Problems associated with the use of PTFE include its inability to protect all catalyst sites, especially those in small pores, and the danger that it may mask active catalytic sites. Since gold can be deposited as very small nuclei, of the same size as the active catalyst (eg 10–100 Å diameter), it is able to penetrate into the pores of the catalyst and therefore, we believe, provides more efficient control of the catalyst water content.

The electrocatalyst materials described here will be of use in the phosphoric acid fuel cell (PAFC) and in the other acid electrolyte fuel cells, for example in the solid polymer fuel cell (SPFC), also known as the proton exchange membrane fuel cell (PEMFC), in which the electrolyte comprises a solid proton-conducting polymer membrane commonly based on perfluorosulphonic acid materials. The materials described here will also be of use other acid electrolyte environments in addition to the acid electrolyte fuel cell.

The electrocatalyst materials of the present invention will now be described by Example.

Hereinafter, we shall use the terms "activity" and "performance" as defined below. Hydrophobic electrodes are prepared by mixing the catalyst with PTFE, applying to a wet-proofed carbon paper and sintering as is usually practised in the art.

Activity and performance are measured in a half cell using air and oxygen as reactants. The measurements are made at 180° C. atmospheric pressure and in 100% phosphoric acid electrolyte. Activity is a measure of the oxygen reduction ability per unit weight of the platinum present, and is measured by the current flow through the electrode at an IR (Internal Resistance)-free potential of 900 mV, versus a Dynamic Hydrogen Electrode (DHE), with oxygen as reactant, and is expressed in terms of milliamps per milligram of platinum present. In practice, PAFC cathodes operate using air as oxidant gas, and at high current densities (greater than 100 mA/cm$^2$). For electrode performance measurement we quote the IR-free electrode potential at 200 mA/cm$^2$ with air as the oxidant.

EXAMPLE 1

Comparative Example

Pt 10.0 wt %, Ni 3.0 wt %, on EC72R Carbon (XC72R carbon is a furnace black carbon available from Cabot Europe Ltd, Neuilly sur Seine, France.)

XC72R (87 g) was added to 6 liters of demineralised water (pH=6.0) at 60° C. with stirring. The slurry was maintained at 65° C. for 30 minutes. Sodium bicarbonate solution (31.9 g in 200 cm$^3$H$_2$O) was added and the temperature increased to 98° C. and maintained for 30 minutes. Chloroplatinic acid (10 g Pt equivalent dissolved in 200 cm$^3$ H$_2$O) was added to the slurry via a peristaltic pump over 10 minutes.

NiCl$_2$6H$_2$O (3 g=Ni in 200 cm$^3$ H$_2$O) was then added via the peristaltic pump over 10 minutes, and the slurry boiled for a further 2 hours.

The slurry was allowed to cool to 90° C. and a formaldehyde solution (1% v/v, 280 cm$^3$) was added from a peristaltic pump over 10 minutes. The slurry was further boiled for 1 hour, after which it was cooled to 90° C. and filtered. The filtrate was washed free of soluble chloride ion with demineralised water.

The filtrate cake was dried overnight in an air oven at 105° C., and crushed with a mortar and pestle.

The material was then heated to a temperature of 930° C. in a flowing nitrogen atmosphere and maintained at this temperature for 60 minutes to form the alloy This gave a catalyst with a nominal composition of 10 wt % Pt, 3 wt % Ni and a Pt:Ni atomic ratio of 50:50.

EXAMPLE 2

Comparative Example

Pt/Ni 10.0 wt % on Shawinigan Carbon (Shawinigan carbon is an acetylene black carbon available from Chevron Chemicals, Houston, Tex., USA)

The preparation in Example 1 was repeated but with 87 g Shawinigan carbon instead of XC72R.

EXAMPLE 3

Example

Pt 10.0 %, Ni 3.0 %, Au 1.0% on XC72R Carbon

The method as described in Example 1 was used to prepare a Pt/Ni catalyst at 10 wt % Pt loading 24.75 g of this catalyst was added to 6 liters of preheated (60° C.) demineralised water (pH 6.0) and the resultant slurry maintained at 60° C. for 30 minutes. NaHCO$_3$ (0.43 g) was dissolved in H$_2$O (150 cm$^3$) and added to the slurry via a peristaltic pump, over 10 minutes and the slurry was brought to boil. This condition was maintained for 30 minutes at 100° C. HAuCl$_4$ (0.25 g Au metal equivalent), dissolved in 200 cm$^3$ H$_2$O, was added via a peristaltic pump over 10 minutes. The slurry was boiled for a further 2 hours and then allowed to cool. Formaldehyde solution, (7 cm$^3$, 1% v/v) was added via a peristaltic pump at −80° C. The slurry was then boiled for a further 1 hour after which it was cooled to 90° C., filtered and washed free of soluble chloride ion with demineralised water. The filtrate cake was dried overnight in an air oven at 105° C. and crushed with a mortar and pestle. This gave a catalyst with a nominal composition of 10.0 wt % Pt, 3.0 wt % Ni and 1.0 wt % Au.

EXAMPLE 4

Example

Pt 10.0 wt %, Ni 3.0 wt %, Au 1.0 wt % on Shawinigan Carbon

The method as described in Example 2 was used to prepare a Pt/Ni (10 wt % Pt) catalyst. The method as described in Example 3 was then used with this material to prepare a Pt/Ni/Au catalyst.

The activity of the Pt/Ni/Au catalysts for both types of carbon support demonstrated an unexpected increase in performance as shown by standard half-cell polarisation measurements (FIGS. 1 and 2). Activity and performance data are collated in Table 1.

| Example No. | Formulation | Nominal Loading wt % Pt, Ni, Au | Activity mA/mg Pt on O$_2$ | Performance mV at 200 mA/cm$^2$ on air |
|---|---|---|---|---|
| 1 | Pt/Ni/XC72R | 10, 3, 0 | 48.9 | 728 |
| 2 | Pt/Ni/Sh | 10, 3, 0 | 49.4 | 737 |
| 3 | Pt/Ni/Au/XC72R | 10, 3, 1 | 51.7 | 741 |
| 4 | Pt/Ni/Au/Sh | 10, 3, 1 | 58.0 | 748 |

The activity and performance of the prior art catalysts, as exemplified in Examples 1 and 2 demonstrate activity and performance trends which are typical of those expected for platinum alloy catalysts (see, for example, F J Luczak and D A Landsman in U.S. Pat. No. 4,447,506).

It can be readily seen that the materials of the invention, comprising Au addition to the alloy catalysts (Examples 3 and 4) demonstrate improved activity and performance over the prior art materials.

We claim:

1. An electrocatalyst material for use in an acid electrolyte environment, comprising platinum alloyed by heat treatment to effect a change in platinum crystal lattice dimensions with at least one alloying element, and gold, said alloyed platinum and said gold being supported on a conductive support, the atomic ratio of platinum to the alloying element being in the range 80:20 to 20:80, and wherein the gold is present in a loading of 0.0001 up to but not including 3 wt % of the total catalyst weight.

2. An electrocatalyst material according to claim 1, wherein the alloying element is one or more selected from groups IVB, VIB, VIIB, VIII, IB and IIIA of the Periodic Table.

3. An electrocatalyst material according to claim 2, wherein the alloying element is one or more of Ti, Cr, Mn, Fe, Co, Ni, Cu, Zr and Hf.

4. An electrocatalyst material according to claim 3, wherein the alloying element is one or more of Cr, Mn, Co and Ni.

5. An electrocatalyst material according to claim 4, wherein the alloying element is Ni.

6. An electrocatalyst material according to claim 1 wherein there is also present 0.05 to 0.5 wt % rhodium.

7. An electrode comprising an electrocatalyst material according to claim 1.

8. An acid electrolyte fuel cell comprising, as the electrocatalyst, the electrocatalyst material of claim 1.

9. A method of manufacture of an electrocatalyst material for use in an acid electrolyte environment, said electrocatalyst comprising platinum alloyed by heat treatment to effect a change in platinum crystal lattice dimensions with at least one alloying element, and gold, said alloyed platinum and said gold being supported on a conductive support, the atomic ratio of platinum to the alloying element being in the range 80:20 to 20:80, and wherein the gold is present in a loading of 0.0001 up to but not including 3 wt % of the total catalyst weight, said method comprising the steps of the addition of at least one compound of gold to a slurry of a platinum alloy catalyst, followed by reduction of the gold.

* * * * *